(12) United States Patent
Fishman

(10) Patent No.: US 6,296,030 B1
(45) Date of Patent: Oct. 2, 2001

(54) WHEEL COMPRISING TUBELESS TIRE AND RIM WITH ANNULAR MOUNTING WELL

(76) Inventor: Jordan Sidney Fishman, 4015 Flamingo Ave., Sarasota, FL (US) 34242

( * ) Notice: Subject to any disclaimer, the term of this patent is extended or adjusted under 35 U.S.C. 154(b) by 0 days.

(21) Appl. No.: 09/068,344
(22) PCT Filed: Nov. 8, 1996
(86) PCT No.: PCT/GB96/02737
  § 371 Date: Dec. 15, 1998
  § 102(e) Date: Dec. 15, 1998
(87) PCT Pub. No.: WO97/18097
  PCT Pub. Date: May 22, 1997

(30) Foreign Application Priority Data

Nov. 16, 1995 (GB) .................................................. 9523407

(51) Int. Cl.$^7$ ................................ B60C 3/04; B60C 9/06; B60C 15/00
(52) U.S. Cl. ............................ 152/454; 152/554; 152/559
(58) Field of Search .................................... 152/559, 454, 152/554

(56) References Cited

U.S. PATENT DOCUMENTS 3,068,926 * 12/1962 Jacob et al. ...................... 152/559 X

* cited by examiner

Primary Examiner—Adrienne C. Johnstone
(74) Attorney, Agent, or Firm—Bracewell & Patterson LLP

(57) ABSTRACT

A tire and wheel assembly for a forklift type vehicle includes a rim having an annular well to enable fitting of tubeless tires and a tire having an aspect ration of 58% or less. The tire is inflated to a pressure of at least 125 pounds per square inch (psi) and has fabric cross plies extending a distance of at least 30% up the inner face of the side walls of the tire.

1 Claim, 1 Drawing Sheet

WHEEL COMPRISING TUBELESS TIRE AND RIM WITH ANNULAR MOUNTING WELL

BACKGROUND OF THE INVENTION

1. Field of the Invention

This invention concerns a wheel—by which is meant the combination of a rim and tire and more particularly, such wheel specifically for a forklift truck or similar vehicle.

2. Description of the Related Art

Such vehicles ordinarily, in the interests of small size and maneuvrability, have wheels of small diameter. Such vehicles also require brake drums of as large a diameter as possible, on account of their need to brake at frequent intervals, to ensure adequate stopping power, reasonable working life, and tolerable increases in brake temperature. The brake drums are ordinarily fitted within the rim inside diameter.

For these reasons, tires having inner tubes on existing flat-base rims are normal, tubeless tires requiring rims with deep annular wells (to enable fitting of the tires) which necessarily reduce the diameter of brake drums which might otherwise be used.

Tires with inner tubes and flaps are clearly more costly than tubeless tires as are the multi-piece rims which carry them.

BRIEF SUMMARY OF THE INVENTION

The present invention is based on an appreciation of the possibility of providing a heavy gauge wheel having a rim adapted to be fitted with a tubeles tire and with the rim having an internal diameter comparable with or larger than that of a rim adapted to be fitted with a tire of the kind having an inner tube by using a tire of lower aspect ratio than has been used hitherto and at the same time maintaining the same outside diameter and width as a tube type tire.

According to the invention there is provided a tire and wheel assembly for a forklift truck or similar vehicle comprising a rim having an annular well to enable fitting of a tubeless tire and a tire having an aspect ratio of 58% or less.

A series of tires with the following dimensions exemplify preferred assemblies:

| OD ±7% | TIRE-WIDTH ±7% | RIM DIAMETER ±10% |
|---|---|---|
| 33.5" (85 cm) | 9.0" (22.8 cm) | 23.0" (58.4 cm) × 7.25 (18.4 cm) |
| 26.5" (67 cm) | 10.0" (25 cm) | 17.5" (44.4 cm) × 7.25 (18.4 cm) |
| 26.5" (67 cm) | 8.0" (20 cm) | 17.5" (44.4 cm) × 6.0 (15 cm) |
| 23.0" (58.4 cm) | 7.5" (19 cm) | 15.0 (38 cm) × 6.0 (15 cm) |
| 21.0" (53 cm) | 6.5" (16.5 cm) | 14.0 (35.5 cm) × 5.0 (12.2 cm) |
| 18.0" (45.7 cm) | 5.5" (14 cm) | 12.0 (30. cm) × 4.25 (10.8 cm) |

Whereas tires having such low aspect ratios and special sizes would be quite unsuitable for many applications such as conventional highway truck tires, they have advantage for the contemplated applications in providing for much greater stability for forklift trucks. Better braking because the use of larger brakes is possible. Also much higher carrying capacity.

For the avoidance of confusion, we hereby confirm that the term "aspect ratio" as used herein is the ratio of the radial thickness to the width of the tire.

The tire must have the fabric of its cross plies extending up the inner face of the side walls of the tire to cover at least 30% of the height of the side walls. This additional stiffness will increase the tire's stability.

The tire should be inflated to a pressure of at least 125 p.s.i.(9 bar).

BRIEF DESCRIPTION OF THE DRAWINGS

The invention will be further apparent from the following description, with reference to the figures of the accompanying drawing, which show, a conventional rim and tire assembly and, by way of example only, one form of assembly embodying same.

Of the drawing.

DETAILED DESCRIPTION OF THE INVENTION

Figure 2:
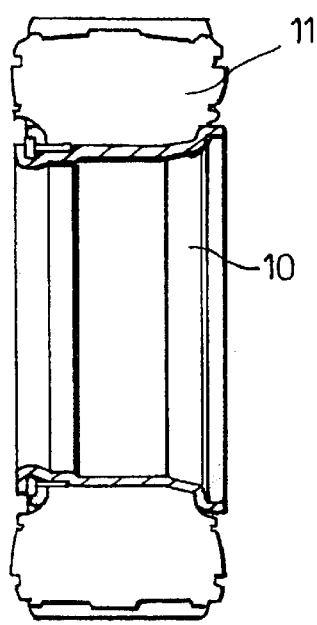
FIG. 2 shows a cross-section through the assembly on the line II—II of FIG. 1.
Figure 1:
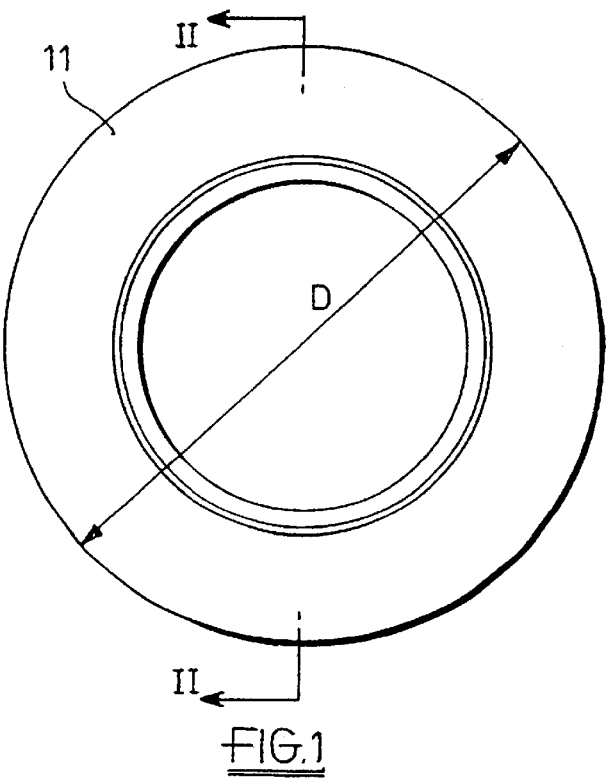
FIG. 1 shows a side view of a conventional assembly.
Figure 4:
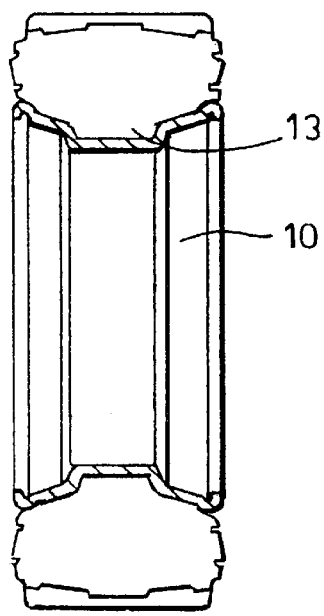
FIG. 4 shows a cross-section through the assembly on the line IV—IV of FIG. 3.
Figure 3:
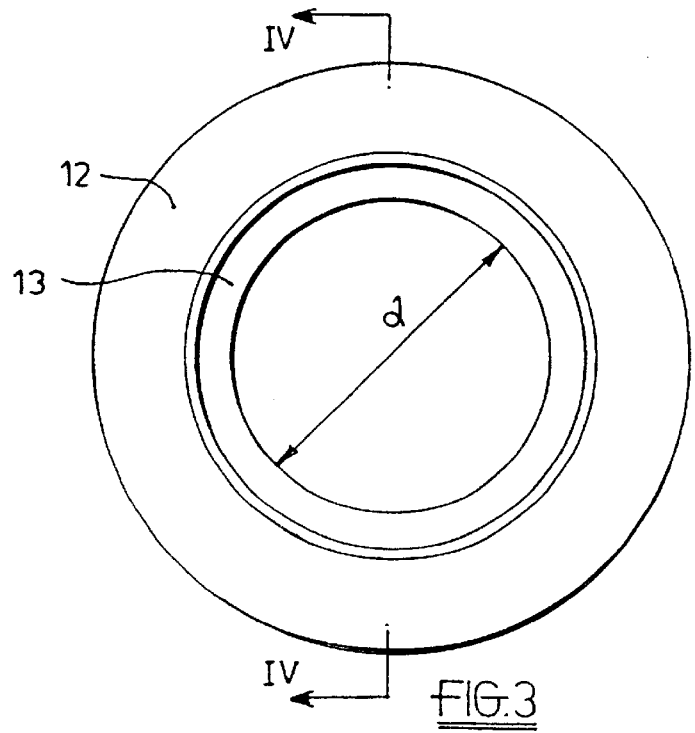
FIG. 3 shows a side view of an assembly embodying the invention.

Referring now to the drawing, it will be seen that both assemblies have the same overall diameter D, as specified and wheel rims 10 of the same internal diameter d.

On the conventional assembly, the tire 11 has an inner tube and is seated on a rim of substantially constant diameter across its width.

On the assembly embodying the invention, the tire 12 is tubeless and is seated on a rim having a central annular well 13 to enable fitting of the tire.

The similarity of the dimensions D and d (or larger) on the two assemblies is possible because the assembly embodying the invention has a tire of relatively small aspect ratio of 58% or less as exemplified by the following preferred possibilities:

| OD ±7% | TIRE-WIDTH ±7% | RIM DIAMETER ±10% |
|---|---|---|
| 33.5" (85 cm) | 9.0" (22.8 cm) | 23.0" (58.4 cm) × 7.25 (18.4 cm) |
| 26.5" (67 cm) | 10.0" (25 cm) | 17.5" (44.4 cm) × 7.25 (18.4 cm) |
| 26.5" (67 cm) | 8.0" (20 cm) | 17.5" (44.4 cm) × 6.0 (15 cm) |
| 23.0" (58.4 cm) | 7.5" (19 cm) | 15.0 (38 cm) × 6.0 (15 cm) |
| 21.0" (53 cm) | 6.5" (16.5 cm) | 14.0 (35.5 cm) × 5.0 (12.2 cm) |
| 18.0" (45.7 cm) | 5.5" (14 cm) | 12.0 (30. cm) × 4.25 (10.8 cm) |

The tire 12 has the fabric of its cross plies extending up the inner face of the side walls of the tire to cover at least 30% of the light thereof.

The tire 12 is intended to be inflated to a pressure of at least 125 p.s.i.(9 bar)

It will be appreciated that it is not intended to it the invention to the above example only, many variations, such as might readily occur to one skilled in the art, being possible, without departing from the scope thereof.

What is claimed is:

1. A forklift tire and wheel rim assembly for use on a forklift type vehicle comprising:

a rim having an annular well configured to receive a tubeless tire;

the tubeless tire mounted within the annular well, the tubeless tire having side walls with inner and outer faces;

a plurality of fabric cross plies, the cross plies extending up the inner face of the tire sidewalls;

wherein the cross plies extend a distance of at least 30% up the inner face of the side walls of the tubeless tire;

wherein the tubeless tire has an aspect ratio of 58% or less; and wherein the tubeless tire is inflated to a pressure of at least 125 pounds per square inch (psi).

* * * * *